United States Patent
Tauzia et al.

(10) Patent No.: US 6,545,720 B1
(45) Date of Patent: Apr. 8, 2003

(54) METHOD FOR THE DISPLAY OF TELETEXT HEADERS

(75) Inventors: Vincent Tauzia, Mirabel Aux Baronnies (FR); Thierry Crespo, Trets (FR)

(73) Assignee: STMicroelectronics S.A., Gentilly (FR)

( * ) Notice: Subject to any disclaimer, the term of this patent is extended or adjusted under 35 U.S.C. 154(b) by 409 days.

(21) Appl. No.: 09/618,523

(22) Filed: Jul. 18, 2000

(30) Foreign Application Priority Data

Jul. 19, 1999 (FR) .......................................... 99 09491

(51) Int. Cl.$^7$ .............................................. H04N 11/00
(52) U.S. Cl. ...................................... 348/468; 345/689
(58) Field of Search ....................... 348/468; 725/137; 345/689, 703; H04N 11/00

(56) References Cited

U.S. PATENT DOCUMENTS

| | | | | |
|---|---|---|---|---|
| 4,698,677 A | * | 10/1987 | Kinghorn et al. | 348/468 |
| 4,933,764 A | * | 6/1990 | Kinghorn | 348/467 |
| 4,999,706 A | * | 3/1991 | Kinghorn | 348/468 |
| 5,521,712 A | * | 5/1996 | Oguro | 386/95 |
| 5,565,927 A | * | 10/1996 | Van Gestel | 348/467 |
| 5,835,153 A | * | 11/1998 | Pratt et al. | 348/468 |
| 6,239,844 B1 | * | 5/2001 | Raiyat | 348/468 |
| 6,256,072 B1 | * | 7/2001 | Bae et al. | 348/568 |
| 6,424,378 B1 | * | 7/2002 | Crespo et al. | 348/465 |
| 6,456,331 B2 | * | 9/2002 | Kwoh | 348/465 |

FOREIGN PATENT DOCUMENTS

| | | |
|---|---|---|
| EP | 0141460 A1 | 5/1985 |
| GB | 1586431 | 3/1981 |
| WO | WO 95/15647 | 6/1995 |

OTHER PUBLICATIONS

European Telecommunication Standard (ETS 300 706), Enhanced Teletext Specification (May 1997) pp 1–162.*
J.F. Daniels, Wireless World Teletext Decoder, Wireless World, vol. 81, No. 1480, Dec. 1975, pp. 563–566.
European Patent Office—Patent Abstract of Japanese Publication No. 05087038, dated Apr. 2, 1993.
Preliminary search report dated Apr. 5, 2000 for French Patent Application 9909491.

* cited by examiner

Primary Examiner—John Miller
Assistant Examiner—Brian Yenke
(74) Attorney, Agent, or Firm—Lisa K. Jorgenson; Jon A. Gibbons; Fleit, Kain, Gibbons, Gutman & Bongini P.L.

(57) ABSTRACT

In a method for the display of teletext headers on a television receiver screen during a search for a teletext page, the teletext service uses a first group of characters comprising fixed characters and locations to receive variable characters and a second group of sets of characters, each set of characters being proper to a language and being designed to be introduced selectively at the locations of variable characters of said first group. The set of characters to be introduced into the first set is selected as soon as the first data packet enabling it to be identified is received by the TV receiver in such a way that the headers are displayed properly.

16 Claims, 2 Drawing Sheets

| 100 | TELEGÎN 220 | ºub Cum | 14:22:05 |

FIG. 1A

| 100 | TELEGÜN 220 | Şub Cum | 14:22:05 |

FIG. 1B

METHOD FOR THE DISPLAY OF TELETEXT HEADERS

CROSS-REFERENCE TO RELATED APPLICATIONS

This application is based upon and claims priority from prior French Patent Application No. 99-09491, filed Jul. 19, 1999, the entire disclosure of which is herein incorporated by reference.

BACKGROUND OF THE INVENTION

1. Field of the Invention

The present invention relates to the field of broadcast television and more particularly to television receivers capable of receiving teletext messages.

2. Description of Related Art

A teletext system is an auxiliary service provided by television stations in order to transmit written information in addition to video information. This information is conveyed in data packets transmitted in time intervals corresponding to the frame fly-back between two images. When the teletext service of a television channel is launched, the television receiver makes an automatic search for page 100 which is the contents page showing the different sections proposed by the channel. A page number is associated with each section. To access a particular section, the associated page number is entered.

During the search for a teletext page, headers relating to teletext pages received by the television receiver are displayed on the screen exactly as they are received. The data elements contained in the header of a teletext page are contained in a header packet corresponding to the first data packet of the page. The header generally comprises a field in which the name of the TV channel transmitting the teletext page is registered and a field in which the number of the teletext page to which it pertains is registered. Along with this header, the television receiver generally displays the number of the page sought and the current time. These headers are displayed on the screen until the page sought is received by the television receiver. The page sought is then displayed on the screen and the header disappears. It must be noted that certain top range television sets may memorize the teletext pages when they are received, or at least they may memorize the contents page of each channel. Headers then are no longer displayed during a search even if the page sought has not already been memorized.

The character font used by the television receiver to display headers and teletext pages is conventionally stored in a ROM of the receiver. The characters of this font are divided into three groups:

1. a first group called a primary group GO comprising the characters of the alphabet used to write the contents of the pages (for example the Roman alphabet for European channels); this first group comprises fixed characters and locations to receive variable characters;
2. a second group comprising a plurality of sets of characters comprising each of the characters specific to a language (for example a set containing characters specific to French comprising, in particular, the vowels with accents); each set conventionally has 13 characters; and
3. an additional group G2 (not described).

Conventionally, prior to the display of a teletext page, a set of characters of the second group is selected by the television receiver and then inserted into the first group at the locations of the variable characters. The set of characters to be selected to display this page is identified by the control bits C12, C13, and C14 contained in the thirteenth eight-bit byte of its header packet. These control bits depend on the language in which the teletext page to be displayed is written. For example, if the page is in French (this is the case with French channels), the bits C12, C13, and C14 contain the address or a part of the address of the set of characters pertaining to French in the ROM of the TV receiver. Thus, before the display of a teletext page, the microcontroller of the TV receiver reads the bits C12, C13, and C14 of the header packet of this page and selects the corresponding set of characters. Then, the microcontroller displays the teletext page with the fixed characters of the first group and the characters of the set selected in the second group.

It must be noted that the address of the set of variable characters is also contained in special non-displayable packets called X28 and M29. These packets are broadcast by a limited number of television channels. These packets may be sent before or after the header packet of a teletext page.

Although teletext services are useful, they are not without their shortcoming, especially where the receiver is capable of receiving broadcast in different national languages.

One problem arises for the display of headers when the user activates the teletext service after he or she has switched channels and gone to a channel of a different nationality, namely one for which the teletext pages and headers are composed in another language. During the teletext search, the headers are displayed with an incorrect set of characters since the selected set of characters has not been modified since the changing of a channel. It is modified only at the end of the search, just before the display of the teletext page being searched.

This problem is explained by means of an example illustrated by FIGS. 1A and 1B. In this example, a user is watching an Italian television channel, for example the RAI Uno channel. He then switches channels and goes to the Turkish network IRT to watch a Turkish channel TELEGÜN. The user then activates the teletext service to search the contents page (page 100) of the Turkish channel. During this search, the headers are displayed on the screen. These headers are of the type shown in FIG. 1A. The header shown in the screen is that of the teletext page 220 of the Turkish channel. Assuming that the last teletext page displayed was a teletext page of the RAI Uno, the headers are displayed with the set of characters associated with Italian (FIG. 1A).

Since this set of characters is different from the one associated with the Turkish language, errors appear in the title of the name of the Turkish channel. TELEG↑N is displayed instead of TELEGÜN and ○ub instead of Sub. The characters ↑ and Ü are indeed variable characters respectively belonging to the set of Italian and Turkish characters, and they are furthermore introduced in the same location in the first group when their set is selected. This is also the case for the characters ○ and S. FIG. 1B shows the same header but displayed with a Turkish set of characters.

Accordingly, a need exists to overcome this problem of displaying headers in one alphabet with characters for a national language.

SUMMARY OF THE INVENTION

According to the invention, the selection of the set of characters is done at the beginning of the search as soon as a packet of data elements enables the identification of this set of characters has been received by the TV receiver. The method is for the display of teletext headers on a television during a search for a teletext page. The method comprising the steps of: receiving a broadcast signal with a teletext service for broadcasting teletext pages, the teletext service including: a first group of characters in with one or more fixed characters in a received character sequence and one or more locations in the received character sequence capable selectively being changed; and a second group of characters, wherein each of the first group and the second group of characters is part of a national language character font set; searching the broadcast message received for a teletext page; decoding control bits in a first data packet received during the search of the teletext; selecting a set of characters in the second group of characters based upon the control bits decoded; and displaying a portion of the teletext header of one or more teletext pages received, using the characters of the first group combined with characters selected from the second group that are inserted into the one or more locations in the received character sequence that are capable of being changed.

This first packet is either the header packet of the first teletext page received or the packet X28 or a packet M29.

BRIEF DESCRIPTION OF THE DRAWINGS

Other features and advantages of the invention will be seen from the following detailed description made with reference to the appended drawings, of which:

FIGS. 1A and 1B, which have already been described, show a header of a teletext page of a Turkish channel displayed with a set of Italian characters and a set of Turkish characters.

DESCRIPTION OF THE EMBODIMENTS

Figure 2:
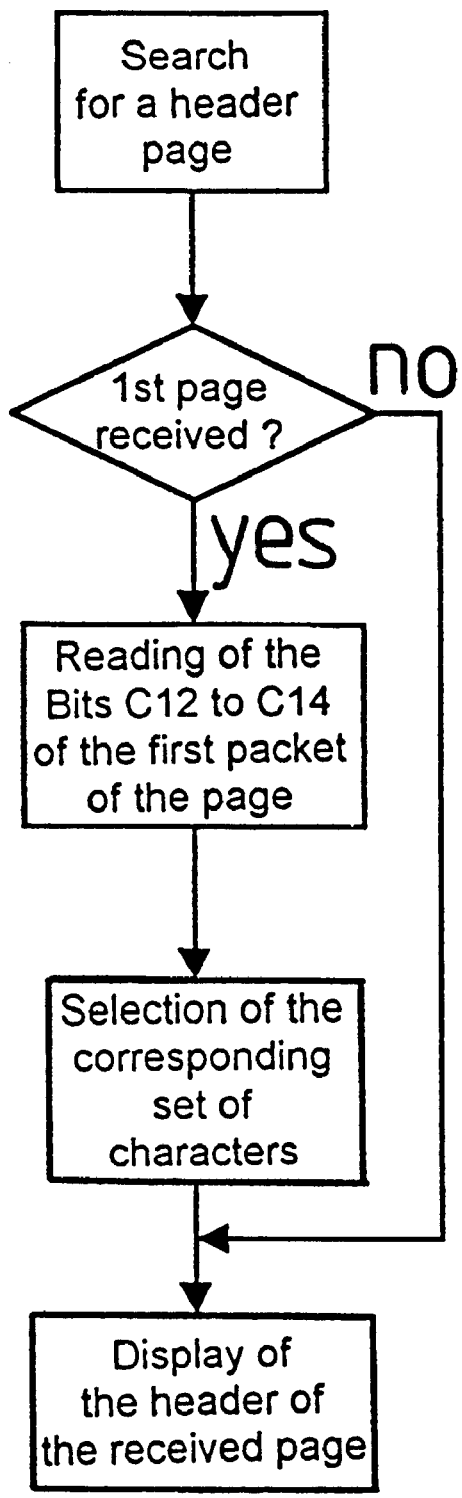
FIG. 2 shows a flow chart of the steps of the method of the invention.

According to the invention, the selection of the set of characters for the display of the headers and of the teletext pages is done at the very beginning of the search for a teletext page. In practice, when the search is launched, the microcontroller of the TV receiver receives a first teletext page and memorizes the data elements of the header packet in an acquisition buffer circuit. Then, depending on the state of particular control bits, C7, C9 and C11, it permits or does not permit the transfer of the displayable data of the header packet into the display memory of the receiver.

Then, if the microprocessor has received the header packet before a packet X28 or M29, it reads the control bits C12, C13, and C14 of this packet and then, in a ROM of the receiver, selects the corresponding set of characters. The microcontroller then transfers the fixed characters of the first group and the characters of the set of selected parameters into one of its registers. This register then contains all the alphabetic characters to be used to display the headers and the teletext pages of the television channel received. The microcontroller then displays the displayable data of the header packet of this first page by using the alphabetic characters contained in the above-mentioned register.

The steps of the method of the invention described above are summarized in the flow chart of FIG. 2. Naturally, for the header of the other teletext pages received by the television receiver, it is unnecessary to again read the control bits C12, C13, and C14 since all the teletext pages and headers relate to one and the same television channel using one and the same set of characters. It is also unnecessary to do so for the display of the teletext page sought.

Should the microprocessor receive a packet X28 or M29 before the header packet, this processor reads this packet to select the set of characters in the second group instead of reading the bits C12, C13, and C14 of the header packet. This makes it possible then to select the set of variable characters as soon as possible so as to obtain an accurate display of the headers during the teletext search.

Although the application of the invention to online shopping has been discussed with reference to the figures, the invention should not be construed as limited thereto. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for the display of teletext headers on a television during a search for a teletext page, comprising the steps of:
   receiving a broadcast signal with a teletext service for broadcasting teletext pages, the teletext service including:
      a first group of characters with one or more fixed characters in a received character sequence and one or more locations in the received character sequence capable of selectively being changed; and
      a second group of characters, wherein each of the first group and the second group of characters is part of a national language character font set;
   searching the broadcast message received for a teletext page;
   decoding control bits in a first data packet received during the search of the teletext;
   selecting a set of characters in the second group of characters based upon the control bits decoded; and
   displaying a portion of the teletext header of one or more teletext pages received, using the characters of the first group combined with characters selected from the second group that are inserted into the one or more locations in the received character sequence that are capable of being changed.

2. The method according to claim 1, wherein the step of displaying includes displaying a portion of the teletext header until the teletext page being searched is received.

3. The method according to claim 1, wherein the step of decoding includes decoding control bits C12, C13 and C14 in a first packet that is a header packet.

4. The method according to claim 1, wherein the step of decoding includes decoding control bits in a first packet that is an X28 packet.

5. The method according to claim 1, wherein the step of decoding includes decoding control bits in a first packet that is a M29 packet.

6. A method for the display of teletext headers on a television during a search for a teletext page, comprising the steps of:
   receiving a broadcast signal with a teletext service for broadcasting teletext pages, the teletext service including:
      a first group of characters with one or more fixed characters in a received character sequence and one or more locations in the received character sequence capable of selectively being changed; and
      a second group of characters, wherein each of the first group and the second group of characters is part of a national language character font set;

searching the broadcast message received for a teletext page;

receiving a first data packet; and determining if the first data packet received during the search of the teletext is not a header packet, and if the first packet received is not a header packet then performing the sub-steps of:

decoding control bits in a first data packet;

selecting a set of characters in the second group of characters based upon the control bits decoded; and displaying a portion of the teletext header of one or more teletext pages received, using the characters of the first group combined with characters selected from the second group that are inserted into the one or more locations in the received character sequence that are capable of being changed.

7. The method according to claim 6, wherein the step of determining if the first data packet received during the search of the teletext is not a header packet, and if the first packet received is a header packet then performing the sub-step of displaying a portion of the teletext header received.

8. The method according to claim 6, wherein the step of displaying includes displaying a portion of the teletext header until the teletext page being searched is received.

9. The method according to claim 6, wherein the step of decoding includes decoding control bits C12, C13 and C14 in a first packet that is a header packet.

10. The method according to claim 6, wherein the step of decoding includes decoding control bits in a first packet that is an X28 packet.

11. The method according to claim 6, wherein the step of decoding includes decoding control bits in a first packet that is a M29 packet.

12. A method for the display of teletext headers on a television during a search for a teletext page, comprising the steps of:

receiving a broadcast signal with a teletext service;

decoding the control bits of the packet;

searching for a teletext page in the broadcast signal;

determining if the first packet received is a header packet and if the first packet is a header packet then performing the sub-steps of:

selecting a first set of characters representing an alphabet and selecting a second set of characters representing a characters specific to a national language based upon the control bits decoded;

displaying the teletext header received using the first set and the second set of characters selected;

wherein if the first packet received is not a header packet then performing the sub-steps of:

selecting a second set of characters representing a characters specific to a national language based upon the control bits decoded; and displaying the teletext header received using a first set of characters previously used and the second set of characters selected.

13. The method according to claim 12, further includes the step of: displaying the teletext header until the teletext page being searched is received.

14. The method according to claim 12, wherein the step of decoding includes decoding control bits C12, C13 and C14 in a first packet that is a header packet.

15. The method according to claim 12, wherein the step of decoding includes decoding control bits in a first packet that is an X28 packet.

16. The method according to claim 12, wherein the step of decoding includes decoding control bits in a first packet that is a M29 packet.

* * * * *